United States Patent [19]
Suzuki et al.

[11] Patent Number: 5,092,490
[45] Date of Patent: Mar. 3, 1992

[54] QUANTITATIVELY SUPPLYING APPARATUS

[75] Inventors: Tomosaburo Suzuki, Kanagawa; Sanji Kawakami, Kodaira, both of Japan

[73] Assignee: Daisey Machinery Co., Ltd., Tokyo, Japan

[21] Appl. No.: 716,767

[22] Filed: Jun. 19, 1991

Related U.S. Application Data

[63] Continuation of Ser. No. 549,555, Jul. 9, 1990, abandoned, which is a continuation of Ser. No. 356,674, May 16, 1989, abandoned, which is a continuation of Ser. No. 108,704, Oct. 15, 1987, abandoned.

[51] Int. Cl.⁵ .................... B67D 5/08; G01G 13/00
[52] U.S. Cl. ........................... 222/56; 222/77; 141/83; 177/121; 177/123
[58] Field of Search .............. 222/55, 56, 77, 547, 222/564; 177/121–123; 141/83; 198/505

[56] References Cited

U.S. PATENT DOCUMENTS

| | | | |
|---|---|---|---|
| 2,930,569 | 3/1960 | Peterson | 177/123 X |
| 2,954,202 | 9/1960 | Bale, Jr. | 177/122 X |
| 3,172,491 | 3/1965 | Mainey | 177/122 X |
| 4,136,804 | 1/1979 | Kinzler et al. | 222/547 |
| 4,243,054 | 1/1981 | Graalmann et al. | 198/505 X |
| 4,337,878 | 7/1982 | Brock | 177/123 X |
| 4,359,176 | 11/1982 | Johnson | 222/561 X |
| 4,867,343 | 9/1989 | Ricciardi et al. | 222/56 X |
| 4,938,385 | 7/1990 | Hayashi | 222/644 X |

FOREIGN PATENT DOCUMENTS

| | | | |
|---|---|---|---|
| 0145942 | 11/1980 | Japan | 222/56 |
| 0066120 | 4/1985 | Japan | 222/77 |
| 61-60414 | 3/1986 | Japan | 222/56 |
| 2166845 | 5/1986 | United Kingdom | 222/56 |

Primary Examiner—Kevin P. Shaver
Assistant Examiner—Gregory L. Huson
Attorney, Agent, or Firm—Oblon, Spivak, McClelland, Maier & Neustadt

[57] ABSTRACT

A quantitatively supplying apparatus is provided which includes a weighing bucket having a discharge mechanism at the bottom, a load cell for detecting the weight of said weighing bucket, and a transferring conveyor for supplying goods to said weighing bucket continuously, in which shutters are arranged in a goods drop passage leading from said transferring conveyor to said weighing bucket so as to be actuated to shut the passage at least partially. According to this apparatus, the amount of the goods dropped can be reduced by closing the shutters partially, and the accuracy with which the goods are quantitatively taken out can be heightened by accurately detecting the time at which the amount of the goods reaches a fixed weight. The apparatus also enables the goods to be quantitatively removed accurately by closing the shutters completely when the fixed weight is reached and thus stopping the acceptance of the goods by the weighing bucket.

9 Claims, 3 Drawing Sheets

QUANTITATIVELY SUPPLYING APPARATUS

This application is a continuation of application Ser. No. 07/549,555, filed on July 9, 1990, now abandoned which is a continuation of appln. Ser. No. 07/356,674, filed on May 16, 1989, now abandoned which is a continuation of appln. Ser. No. 07/108,704, filed on Oct. 15, 1987, now abandoned.

BACKGROUND OF THE INVENTION

1. Field of the Invention:

This invention is intended to provide an automatic weighing apparatus which is used when goods are packed into bags for weighing their amount quantitatively or in the like cases.

2. Description of the Prior Art:

Such an apparatus has been already known in which goods such as sprouting beans to be packed into bags are continuously transferred into a weighing bucket for weighing a fixed weight of goods by a transferring conveyor, and discharged when the amount of the goods in the weighing bucket reaches a fixed weight. However, it is difficult for this apparatus to take out the goods quantitatively with accuracy.

In order to remove the problem of this conventional apparatus, another apparatus has been presented in which goods are sent into a weighing bucket by a transferring conveyor by a usual manner until their amount reaches a primary weight which is a little smaller than the weight to be weighed, and after the primary weight is reached, the goods are transferred into the weighing bucket little by little by slowing down the speed of the transferring conveyor until the weight to be weighed is reached, and thus increasing the accuracy with which the goods are quantitatively taken out (Japanese Patent Application No. 59-170930).

In these prior apparatuses, goods continue to be incessantly transferred from a transferring conveyor into a weighing bucket, so it is difficult for the goods to be quantitatively taken out with greater accuracy than a limited one. As a result, these prior apparatuses cannot be satisfactorily applied to some cases.

This invention is therefore intended to provide a quantitatively supplying apparatus which enables goods to be quantitatively taken out with greater accuracy.

SUMMARY OF THE INVENTION

This invention enables goods to be quantitatively taken out with greater accuracy by the provision of shutters for closing a goods drop passage at least partially when the amount of the goods in the weighing bucket reaches a prefixed weight, between a transferring conveyor for supplying the goods continuously into a weighing bucket and said weighing bucket.

In this invention, as mentioned above, shutters are arranged in a passage through which goods drop from a transferring conveyor to a weighing bucket. When the weighing bucket weighs a given weight, the drop passage leading from the transferring conveyor to the weighing bucket is completely closed and the goods falling from the transferring conveyor to the weighing bucket are received by the shutters. Accordingly, the goods in the weighing bucket can be taken out without an excessive amount of goods entering the weighing bucket, whereby the accuracy with which the goods are quantitatively taken out can be increased.

In the apparatus according to this invention, it is further devised that the passage through which the goods drop from the transferring conveyor to the weighing bucket can be partially closed by shutters, when the weight of goods in the weighing bucket reaches a prefixed weight less than the weight to be finally weighed. Accordingly, the goods then enter the weighing bucket little by little through the partially closed, narrow drop passage, whereby the time at which the weight of the goods in the weighing bucket reaches the given weight can be accurately detected. If the shutters are completely closed or the supply of the goods by the transferring conveyor is stopped at the detected moment, and the goods in the weighing bucket are discharged, they can be quantitatively taken out accurately.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
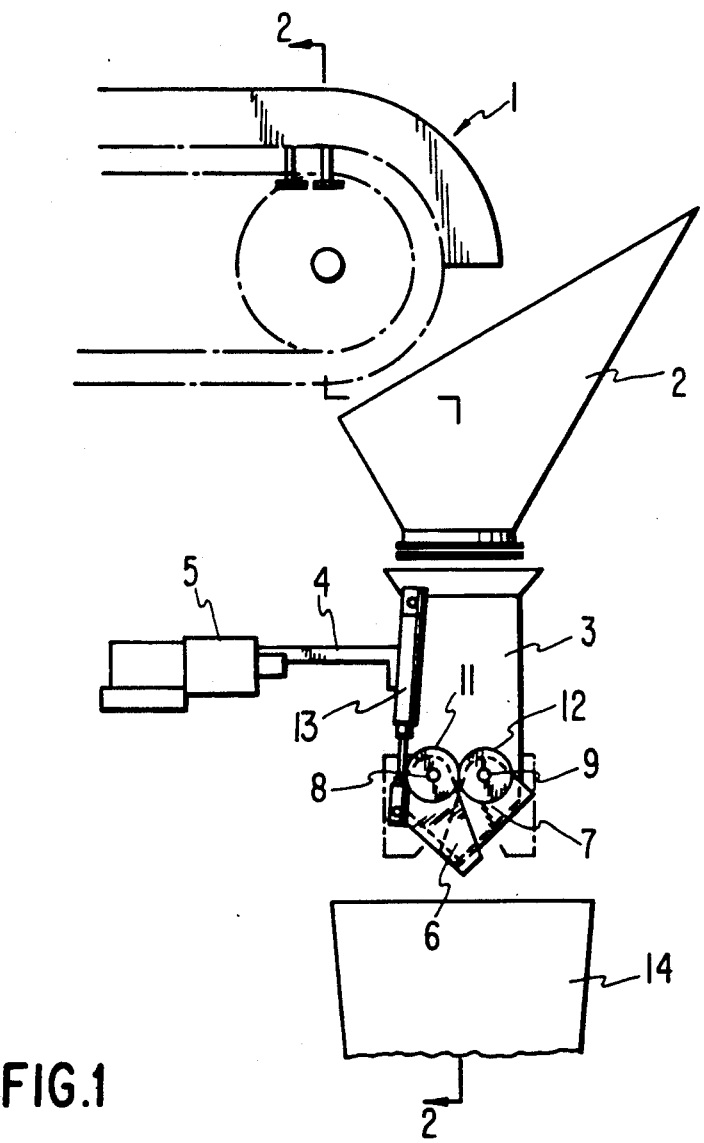
FIG. 1 is a side view of one embodiment.

The invention will be concretely described hereafter with reference to the illustrated examples.

In the drawings, reference numeral 1 represents a transferring conveyor which continuously supplies goods to be quantitatively weighed to a weighing bucket, and 2 represents a hopper which receives the goods dropped from the transferring conveyor 1 and guides the goods to a weighing bucket 3.

The weighing bucket 3 is supported by a load cell 5 by way of a lever 4, and the weight of the weighing bucket 3 can be weighed by the load cell 5.

The weighing bucket 3 is obliquely opened at the lower end, as shown in FIG. 1, and its opening will be opened or shut by two opening and shutting devices 6, 7. The opening and shutting devices 6, 7 are each fixed to pins 8, 9, and both the pins have gears 11, 12 fixed thereon so as to intermesh with each other.

The piston of an air cylinder 13 whose upper end is pivotally fitted to the weighing bucket 3 is pivotally attached to the opening and shutting device 6. When the cylinder 13 expands or contracts, the opening and shutting device 6 is rotated around the pin 8 so that the opening and shutting device 7 is also rotated symmetrically due to the intermeshing of the gears 11, 12, thereby to open or shut the opening at the bottom of the weighing bucket 3.

The reference numeral 14 represents a secondary hopper provided under the weighing bucket 3 so as to receive the weighed goods which are dropping after the bottom of the weighing bucket 3 is opened.

The goods sent continuously by the transferring conveyor 1 drops into the weighing bucket 3 through the hopper 2, whereas shutters 15, 16 are arranged between the hopper 2 and the weighing bucket 3. These shutters are made to shift in and out of a goods drop passage by an air cylinder 17.

Figure 2:
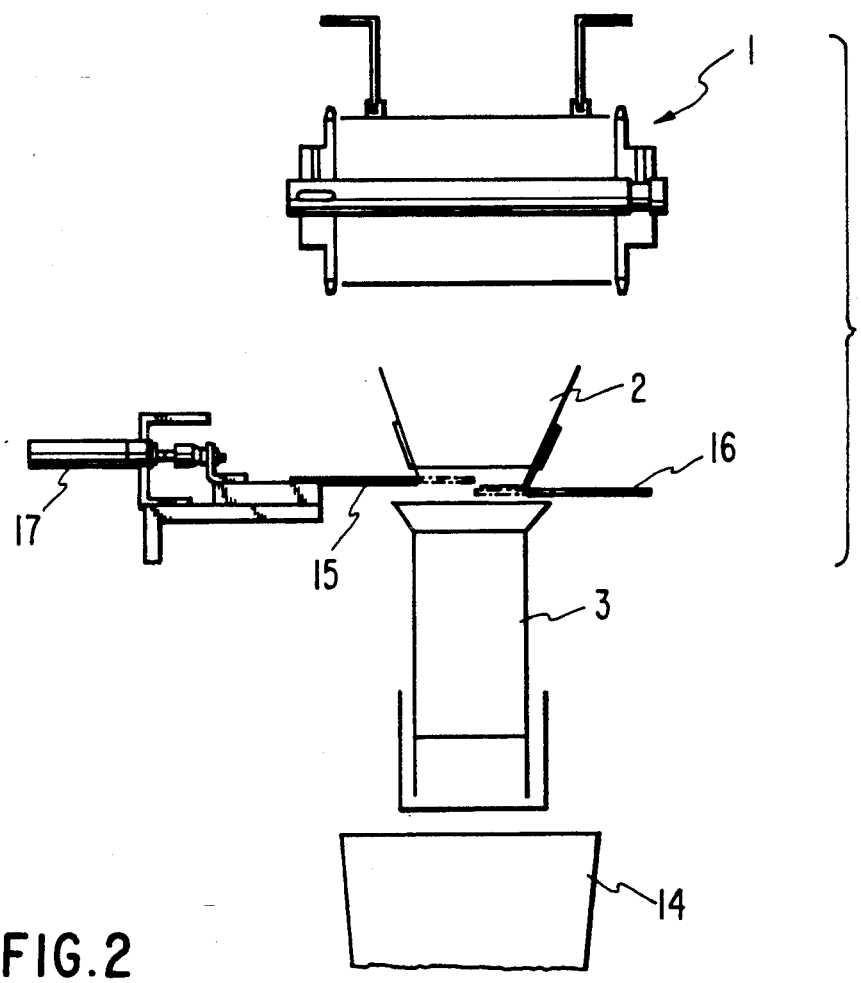
FIG. 2 is a sectional view of FIG. 1 taken along the line II—II.

The shutters 15, 16, as shown in FIG. 2, are arranged with a small lag between them in the vertical direction, so they do not touch each other when they are pushed into the drop passage under the hopper 2 from both sides.

In the example given above, the transferring conveyor 1 has been explained as sending goods at a given speed all the time, but as in the invention of Japanese Patent Application No. 59-170930 mentioned above, it may be one which transfers the goods at normal speed until a prefixed weight somewhat smaller than the weight to be weighed is detected by the load cell 5, and then feeds them at low speed until the shutters are actuated or a given period of time elapses, so that the amount of goods dropped in excess into the weighing bucket 3 from the time when the given weight is detected by the load cell 5 to the time when the shutters 15, 16 prevent dropping of the goods can be reduced to the minimum, thereby increasing the accuracy of weighing.

The transferring conveyor 1 may adopt an intermittent driving system by which the conveyor is stopped as soon as the weighing bucket detects a given weight and then is driven again.

Needless to say, the load cell 5 is not limited to the type shown in the drawings, and some different types may be adopted.

In the example given above, the shutters 15, 16 have been explained as being actuated so as to close the goods dropping passage completely, but they can be advantageously actuated in a manner as described below. That is, the shutter 15 is adapted to be pushed into the drop passage by the air cylinder 17 when goods of a prefixed weight smaller than the final predetermined weight of the goods to be weighed by the weighing bucket 3 droped into the weighing bucket, so as to close the goods drop passage partially.

Since the drop passage is partially closed by the shutter 15, the goods dropped from the transferring conveyor 1 drop into the weighing bucket 3 partially bit by bit, while the rest is deposited on the shutter 15.

When the amount of the goods in the weighing bucket 3 reaches a predetermined weight, the shutter 16 is pushed into the drop passage by an air cylinder (not shown) so as to close the drop passage completely.

Then, the opening and shutting devices 6, 7 are opened and as a result, a given weight of goods is discharged into the secondary hopper 14.

In this example given above, the transferring conveyor 1 has been explained as sending goods at a given speed all the time. Needless to say, however, the transferring conveyor, as in the invention of Japanese Patent Application No. 59-170930 mentioned above, may be one which transfers goods at a normal speed until a prefixed weight somewhat smaller than the weight to be finally weighed is detected by the load cell 5, and then feeds them at low speed until the final weight is detected or a given period of time elapses, so that after the given weight is detected by the load cell 5, the goods are fed into the weighing bucket little by little, thereby to weigh their amount more accurately.

In the examples given above, two shutters 15, 16 are used, one shutter 15 closing the goods drop passage completely or partially and then the other 16 closing the passage completely. But in some cases, the fall passage may be closed completely or partially by one shutter and then the same shutter may be further pushed in so as to close the fall passage totally.

The shutter 16 in the last example given above may be omitted, in which case the transferring conveyor may be stopped as soon as it is detected that goods of the weight to be weighed are in the weighing bucket, and the supply of goods into the weighing bucket may be stopped.

In the examples given above, the shutters 15, 16 for closing the goods falling passage have been illustrated as being of the type which moves horizontally. In some cases, however, there may be adopted shutters of the type which are opened or shut by rotating around pivotally fixed pins like the opening and shutting devices 6, 7, or some different types.

Figure 3:
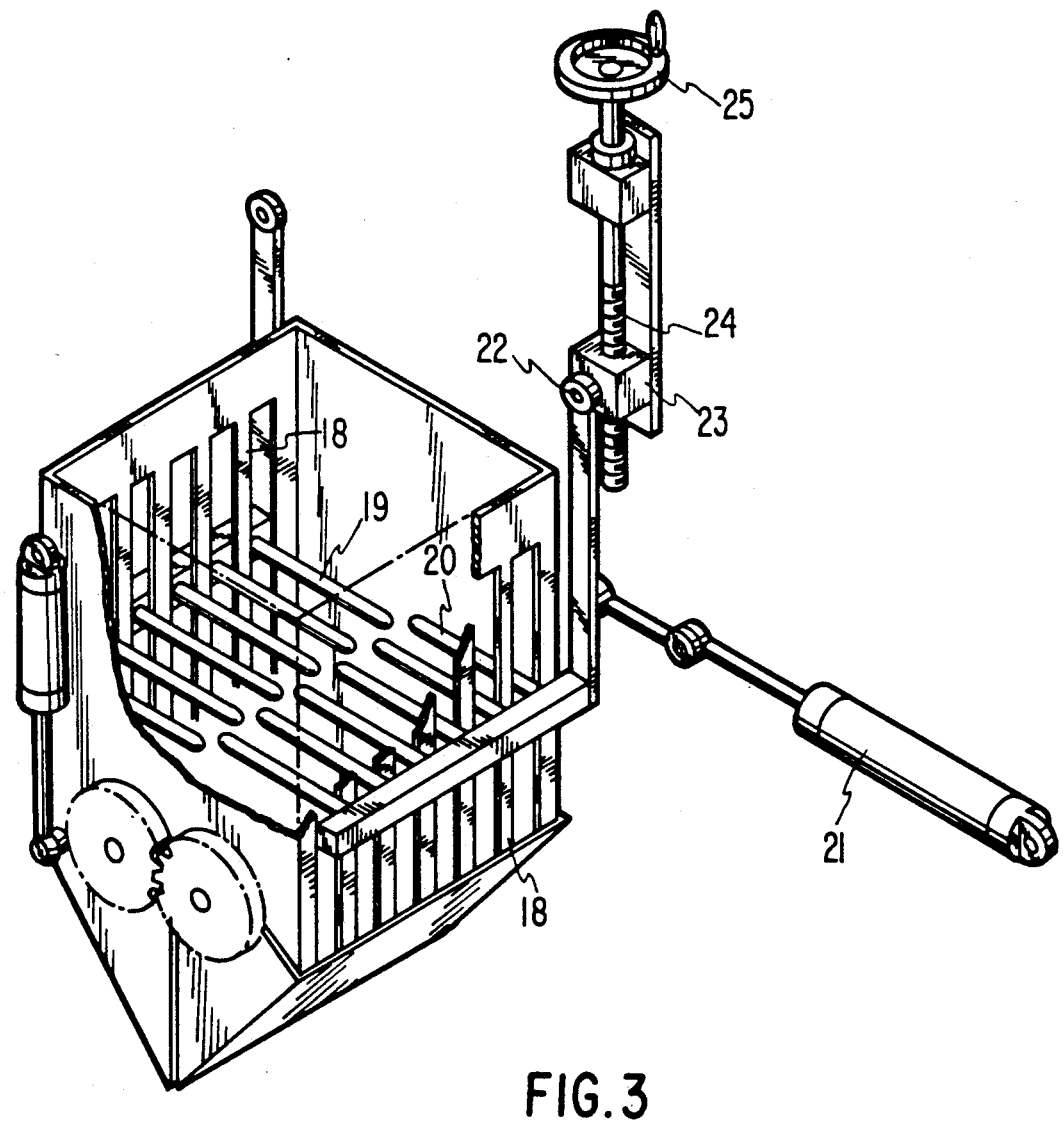
FIG. 3 is a perspective view showing another embodiment of the apparatus.

Next, the example shown in FIG. 3 will be explained. In the device shown in FIG. 3, the opposing two side walls of a weighing bucket each are made up of a lattice 18, and shutters 19, 20 will be pushed out into the weighing bucket through the lattices 18.

The shutter 20 is oscillatorily attached around a pin 22, and the pin 22 is fixed to a nut member 23. The nut member 23 is screw-engaged with a screw rod 24 which can be freely rotated by a handle 25. So, it can be displaced up and down by the rotation of the screw rod 24. The shutter 20 is oscillated around the pin 22 by a cylinder 21, so as to be pushed into or pulled out of the weighing bucket. The shutter 19 is also pushed into or out of the weighing bucket simultaneously with the shutter 20.

In this example, a transferring conveyor and a load cell are not illustrated, but the other parts are the same as those in the examples given above, and each part illustrated in the drawing is given the same reference numeral as in FIG. 1.

In this example, the height of the shutter 19, 20 from the bottom of the weighing bucket can be arbitrarily chosen, and they therefore can be closed just above the bottom of the weighing bucket before excessive goods are deposited there, as soon as it is detected that the weight of the goods in the weighing bucket has reached a given weight.

If the device is designed as mentioned above in which the displacement of the shutters can be arbitrarily selected or set whereby there can be arbitrarily selected the rate at which the shutters close the goods falling passage after the weight of the goods in the weighing bucket has reached a prefixed weight, such will be advantageously adapted to different sorts of goods to be handled.

As concretely explained above, the apparatus according to this invention is one in which a goods drop passage is at least partially closed by shutters when a prefixed weight of goods are received into a weighing bucket. So the amount of goods dropping into the weighing bucket can be decreased by closing the goods falling passage partially by means of the shutters, and thus the time at which the amount of the goods reaches a fixed weight can be accurately detected. This invention has a further advantage in that no other special parts are needed except said shutters.

At the next weighing time, the goods deposited on the shutters by closing the drop passage partially will be thrown into the weighing bucket, such that the next weighing of goods can be effectively carried out.

If the device is so constituted as to totally close the shutters arranged in the goods falling passage when a given amount of goods are received into the weighing bucket, the supply of goods into the weighing bucket is interrupted after the shutters are closed, so a given weight of goods can be quantitatively removed from the weighing bucket.

Obviously, numerous modifications and variations of the present invention are possible in light of the above teachings. It is therefore to be understood that within the scope of the appended claims, the invention may be practiced otherwise than as specifically described herein.

What is claimed is:

1. A quantitatively supplying apparatus, which comprises:
   a weighing bucket having a discharge mechanism at a bottom portion thereof;
   a load cell for detecting the weight of said weighing bucket;
   a transferring conveyor for continuously supplying goods to said weighing bucket in a dispersed and scattered condition;
   a falling zone formed between the transferring conveyor and said weighing bucket;
   means positioned in said falling zone for guiding goods from said transferring conveyor to said weighing bucket;
   at least one shutter arranged between said weighing bucket and said transferring conveyor; and
   means for moving said at least one shutter into and out of the falling zone in response to the weight of goods which have fallen into said weighing bucket detected by said load cell and for partially stopping falling of the goods in said dispersed and scatted condition through said falling zone when the weight of the goods in said weighing bucket reaches a first predetermined weight and more completely stopping falling of the goods in said dispersed and scattered condition though the falling zone upon reaching a second predetermined weight so as to increase weighing accuracy of said weighing bucket wherein said at least one shutter is positioned in said falling zone and receives said goods dropped from said transferring conveyor when said load cell detects a predetermined weight of goods said in weighing bucket.

2. A quantitatively supplying apparatus as set forth in claim 1, wherein said at least one shutter comprises a first and second shutter movable towards and away from one another in response to the weight of goods in said weighing bucket detected by said load cell.

3. An apparatus as set forth in claim 1, which comprises means for regulating the vertical position of the at least one shutter so as to change the vertical distance between at the least one shutter and the bottom of said weighing bucket.

4. A quantitatively supplying apparatus, which comprises:
   a weighing bucket having a discharge mechanism at a bottom portion thereof;
   a load cell for detecting the weight of said weighing bucket;
   a transferring conveyor for continuously supplying goods to said weighing bucket in a dispersed and scattered condition;
   a falling zone formed between the transferring conveyor and said weighing bucket;
   means position in said falling zone for guiding the goods from said transferring conveyor to said weighing bucket;
   at least one shutter arranged between said weighing bucket and said transferring conveyor;
   means for moving said at least one shutter into and out of said falling zone in response to the weight of goods in said weighing bucket detected by said load cell and for partially stopping falling of the goods in said dispersed and scattered condition through the falling zone when the weight of goods in said weighing bucket reaches a first predetermined weight and for more completely stopping falling of the goods in said dispersed and scattered condition through the falling zone upon reaching a second predetermined weight so as to increase weighing accuracy of said weighing bucket wherein said at least one shutter is positioned in said falling zone and receives said goods dropped from said transferring conveyor when said load cell detects a predetermined weight of goods in said weighing bucket; and
   means for slowing the traveling speed of said transferring conveyor after said load cell detects a predetermined weight smaller than said given weight.

5. An apparatus as set forth in claim 4, which comprises means for regulating the vertical position of the at least one shutter so as to change the vertical distance between the at least one shutter and the bottom of said weighing bucket.

6. A quantitatively supplying apparatus which comprises a weighing bucket having a discharge mechanism at the bottom and first and second sidewalls forming a lattice, a load cell for detecting the weight of said weighing bucket, a transferring conveyor for supplying goods to said weighing bucket, and first and second shutters positioned independent of said weighing bucket so as to extend through said first and second sidewalls of said weighing bucket and so as to be movable towards and away from one another and which partially close a goods drop passage leading from said transferring conveyor to said weighing bucket when said load cell detects a predetermined weight of goods in said weighing bucket.

7. An apparatus, as set forth in claim 6, which comprises means for slowing the traveling speed of said transferring conveyor after said given weight is detected.

8. An apparatus, as set forth in claim 6, which comprises means for completely closing said shutters when said load cell detects a weight to be finally weighed.

9. An apparatus, as set forth in claim 6, which further comprises means for regulating the distance from the shutters to the bottom of said weighing bucket can be regulated.

* * * * *